United States Patent [19]
Uno et al.

[11] 3,933,137
[45] Jan. 20, 1976

[54] LOAD FOLLOW-UP DEVICE FOR INTERNAL COMBUSTION ENGINE EQUIPPED WITH SUPERCHARGER

[75] Inventors: Motohiko Uno, Takatsuki; Shigeaki Noma, Ikeda; Hideo Ujiie, Amagasaki; Kazuo Masui, Nara; Tadashi Kanesa, Kawanishi, all of Japan

[73] Assignee: Yanmar Diesel Engine, Co., Ltd., Osaka, Japan

[22] Filed: Mar. 13, 1974

[21] Appl. No.: 450,700

[30] Foreign Application Priority Data
Jan. 26, 1973   Japan............................ 48-12131[U]
Jan. 26, 1973   Japan............................ 48-12132[U]
Jan. 26, 1973   Japan............................ 48-12133[U]
Feb. 3, 1973    Japan.................................. 48-13899

[52] U.S. Cl................ 123/119 CE; 60/601; 60/611
[51] Int. Cl.²......................................... F02D 23/00
[58] Field of Search ...... 123/139 E, 179 F, 119 CE, 123/119 D, 139 ST; 60/600, 601, 603, 608, 611

[56]       References Cited
           UNITED STATES PATENTS
3,303,348   2/1967   Cox et al. ..................... 123/119 CE
3,307,349   3/1967   Brelen ............................ 123/179 F
3,651,636   3/1972   Glassey et al. ......................... 60/611
3,673,796   7/1972   Weick et al. ........................... 60/611

FOREIGN PATENTS OR APPLICATIONS
529,672    11/1940   United Kingdom .......... 123/139 ST Primary Examiner—Manuel A. Antonakas
Attorney, Agent, or Firm—Ladas, Parry, Von Gehr, Goldsmith & Deschamps

[57] ABSTRACT

A load follow-up device for use with an internal combustion engine equipped with a supercharger, comprises detector means operatively connected to the engine for sensing a sudden application of load to the engine; air feed means for feeding air into the engine cylinder; intake air relief means for discharging a portion of the pressurized air present within the intake manifold into atmosphere; means for forcedly shifting the fuel rack towards the fuel increasing side; and control circuit means connected to the detector means for operating the air feed means, intake air relief means and fuel rack shifting means in response to instruction from the detector means. The air feed means, intake air relief means and fuel rack shifting means are so arranged that they operate to faithfully follow up the application of an additional load, thereby preventing reduction in engine speed.

7 Claims, 10 Drawing Figures

LOAD FOLLOW-UP DEVICE FOR INTERNAL COMBUSTION ENGINE EQUIPPED WITH SUPERCHARGER

BACKGROUND OF THE INVENTION

This invention relates to a load follow-up device for an internal combustion engine equipped with a supercharger and, more particularly, to a load follow-up device which is operative to instantly follow-up a sudden application of load for thereby preventing the reduction in the engine speed.

It is commonly known that, when a load is applied suddenly to an internal combustion engine under low-load operation, the supercharger connected to the engine cannot increase its r.p.m. rapidly enough to follow-up the additional load, resulting in the deficiency of the intake air into the engine cylinder. Also the speed governor cannot follow-up the sudden change in the engine speed and provides a short delay, so that the fuel supply, which is normally effected under control of a fuel rack associated with the speed governor, cannot be performed properly in response to the additional load. At this time the engine speed will be reduced and an undesirably decreased speed regulation will be encountered. If the engine is of a generator driving type, this will result in a reduction in the output power frequency and a considerably extended period of time will be required until the engine restores its normal speed or otherwise the engine will stop.

It is therefore an object of this invention to provide a load follow-up device for use with an internal combustion engine equipped with a supercharger. According to this invention the load follow-up device is so constructed as to feed a pressurized air and inject an increased amount of fuel into the engine cylinder for thereby preventing the reduction in the engine speed and also as to have an ability to prevent surging of the supercharger which might otherwise be induced by the load application.

SUMMARY OF THE INVENTION

The foregoing object of this invention is attained by a load follow-up device for use with an internal combustion engine equipped with a supercharger, comprising detector means operatively coupled to the engine for detecting a sudden application of load; air feed means for feeding air into the engine cylinder; intake air relief means for discharging a portion of a high-pressure air present in the intake manifold; means for forcedly shifting the fuel rack towards the fuel increasing side; and control circuit means connected to said detector means for controlling said air feed means, intake air relief means and fuel rack shifting means in response to the instruction from the detector means; said air feed means, intake air relief means and fuel rackshifting means being so arranged that they are operative to faithfully follow-up the load application for thereby preventing the reduction in the engine speed.

DESCRIPTION OF THE PREFERRED EMBODIMENTS

Figure 1:
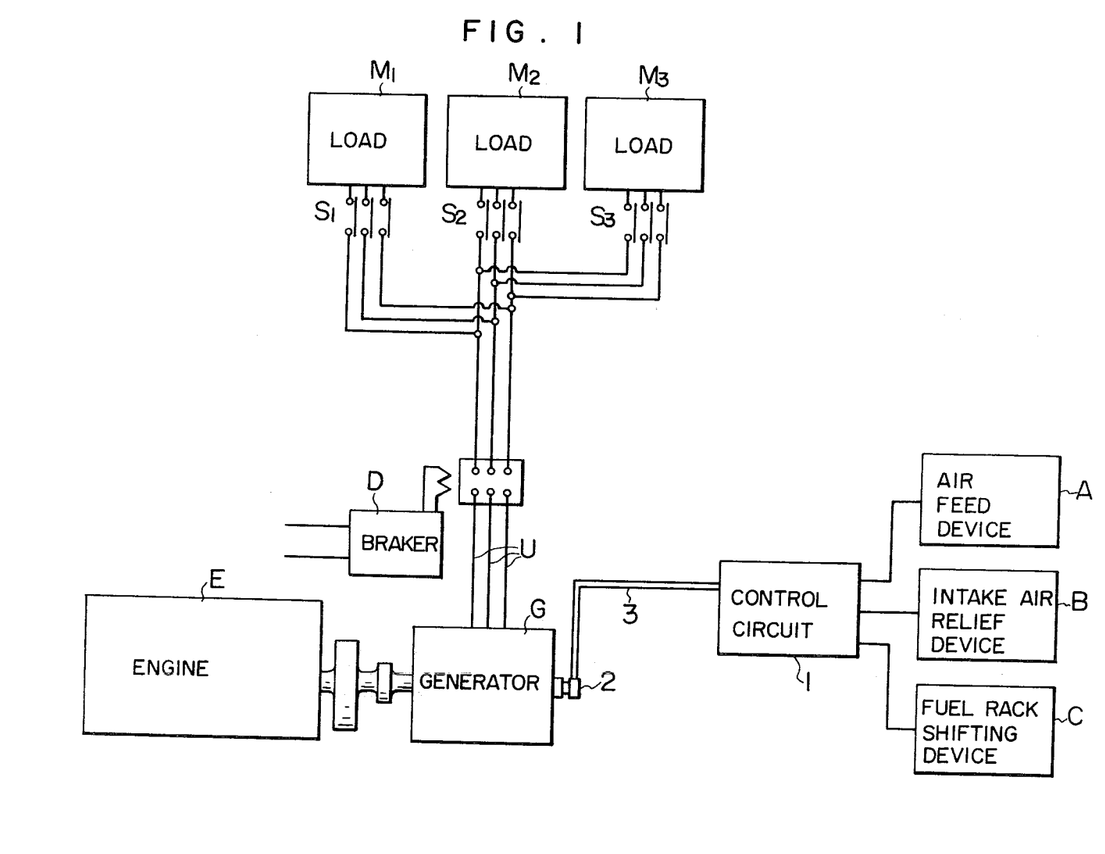
FIG. 1 is a schematic connection diagram of an embodiment according to this invention.

The invention will be described with reference to an embodiment of the load follow-up device shown in FIG. 1, wherein a Diesel engine E, for example, is coupled to a generator G, which in turn is connected by lead wires U to loads $M_1$, $M_2$, $M_3$, etc. by way of a circuit braker D. Indicated at 1 is a control circuit, which is arranged in such a manner as to apply control signals to an air feed device A, intake air relief device B and fuel rack shifting device C. The control circuit 1 is also connected by a revolution change detector 2 by means of a lead 3 for receiving a signal therefrom. The revolution change detector 2 mounted on one end of the rotary shaft of the generator G is designed in such a manner that the contact thereof closes when the r.p.m. of the generator G is reduced suddenly. The construction of the revolution change detector 2 will be detailed later. The air feed device A is so designed as to feed a pressurized air present in the air tank into the engine cylinder by way of a solenoid valve-actuated choke valve; intake air relief device B is so designed as to discharge a portion of the high-pressure air present in the intake manifold into the atmosphere by opening a solenoid valve arranged in the intake manifold in response to the signal from the air feed device; and the fuel rack shifting device C is so designed that the connecting rod extended between the speed governor and fuel rack is actuated by means of a solenoid, for thereby shifting the fuel rack in the fuel increasing side against the action of the speed governor. The above-mentioned three devices will be detailed hereinlater individually.

According to the first embodiment of this invention, the load follow-up device consists of the control circuit 1, revolution change detector 2, air feed device A, intake air relief device B and fuel rack shifting device C.

Figure 2:
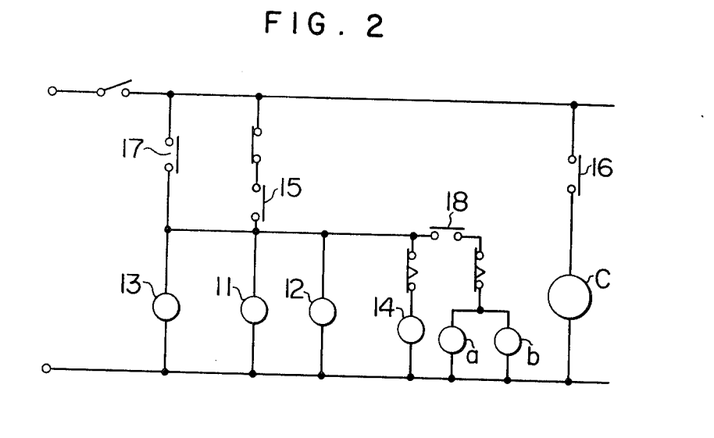
FIG. 2 is an electric circuit diagram of the control circuit device of this invention.

Referring now to FIG. 2 illustrating the circuit diagram of the control circuit 1, solenoid for actuating the air feed device A, intake air relief device B and fuel rack shifting device C are indicated at a, b and c, respectively. Indicated at 11 and 12 are timers which serves to keep operating the air feed device A, intake air relief device B and fuel rack shifting device C for a demanded duration of time after signal reception. Numerals 13 and 14 designate relays for holding switches 15 and 16 respectively, 17 is a switch which is operative upon receiving a signal from the detector, and 18 is a switch which is operative depending on the value of load under normal operation or under conditions where no additional load being applied.

The control circuit device 1 operates as follows:-

At the moment when an additional load is applied suddenly, the switch 17 closes in response to a signal from the revolution change detector. The closure of switch 17 establishes a closed circuit within the control circuit device, so that the solenoid valves a and b as well as a solenoid c start operation. This, in turn, causes the air feed device A, intake air relief device B and fuel rack shifting device C to start operation.

Figure 3:
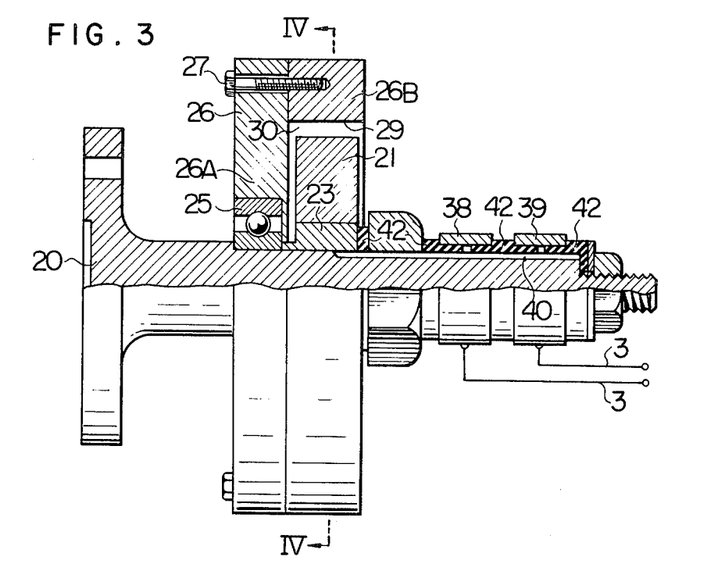
FIG. 3 is a view illustrating the revolution speed change detector of this invention, the detector being shown partially in section.
Figure 4:
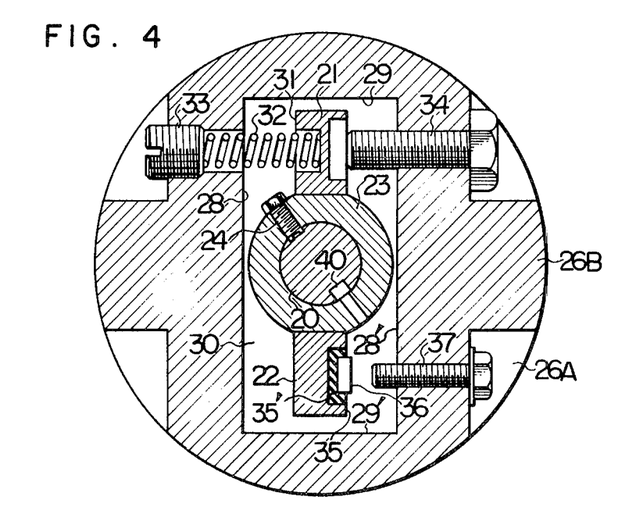
FIG. 4 is a sectional view taken along line A—A of FIG. 3.

Referring now to FIGS. 3 and 4 illustrating the revolution change detector 2, a rotary shaft 20 carries at one end thereof a flange which is coupled to the rotary shaft of the generator G. On the rotary shaft 20 is fixedly mounted a rotary ring 23 by means of a bolt 24. Said rotary ring 23 carries projections 21 and 22. The rotary shaft 20 also has a follower ring 26 mounted thereon and supported by a bearing 25. The follower ring 26 is an assembly of a disc member 26A mounted on the bearing 25 and a cross-shaped member 26B (of which section is best seen from FIG. 4). These members are put together by a bolt 27. The cross-shaped member 26B is provided with an opening 30 having a rectangular cross section. The opening 30 is defined by a pair of opposing side walls 28 and 28' and another pair of opposing side walls 29 and 29' so that the follower ring 26 can receive the rotary shaft 23 in the position as shown in the drawing. Between the front surface 31 of the projection 21 and the opposite side wall 28 of the follower ring 26 is loaded a spring 32. The spring 32 is adjustable by means of a set screw 33. On the side wall 28' of the follower ring 26 is provided with a stopper 34 which is adapted to engage with the front surface 31 of the projection 21. Arranged between the rear surface of the projection 22 and the opposite side wall 28' is a contact device 36 which is biased by a bolt 37. Indicated at 38 and 39 are slip rings mounted around the extension portion of the rotary shaft 20 and connected to the contact device 36 by means of the lead wires (not shown) extending along the axial groove 40 cut in the rotary shaft 20. An insulating material is indicated at 42.

Now the operation of the revolution change detector 2 will be described. When the engine E rotates constantly under a normal load condition, the rotary shaft 20 rotates and the projection 21 engages with the stopper 34, thereby rotating the follower ring 26 for the same number of revolutions as the engine rotation. Under these conditions the contact device 36 is held open. When one or more loads such as $M_1$, $M_2$ and $M_3$ are applied suddenly through the input operation of the corresponding switches $S_1$, $S_2$ and $S_3$, the r.p.m. of the rotary shaft 20 reduces rapidly. On the other hand, because of its inertia the follower ring 26 has a tendency to keep rotating constantly. This results in an offset rotation angle between the rotary shaft 20 and follower ring 26. As a result, the spring 32 is compressed and the contact device 36 is closed upon engagement with a bolt 37, thereby permitting a signal to be sent to the control circuit device 1 by way of the slip rings over load wires 3.

Figure 5:
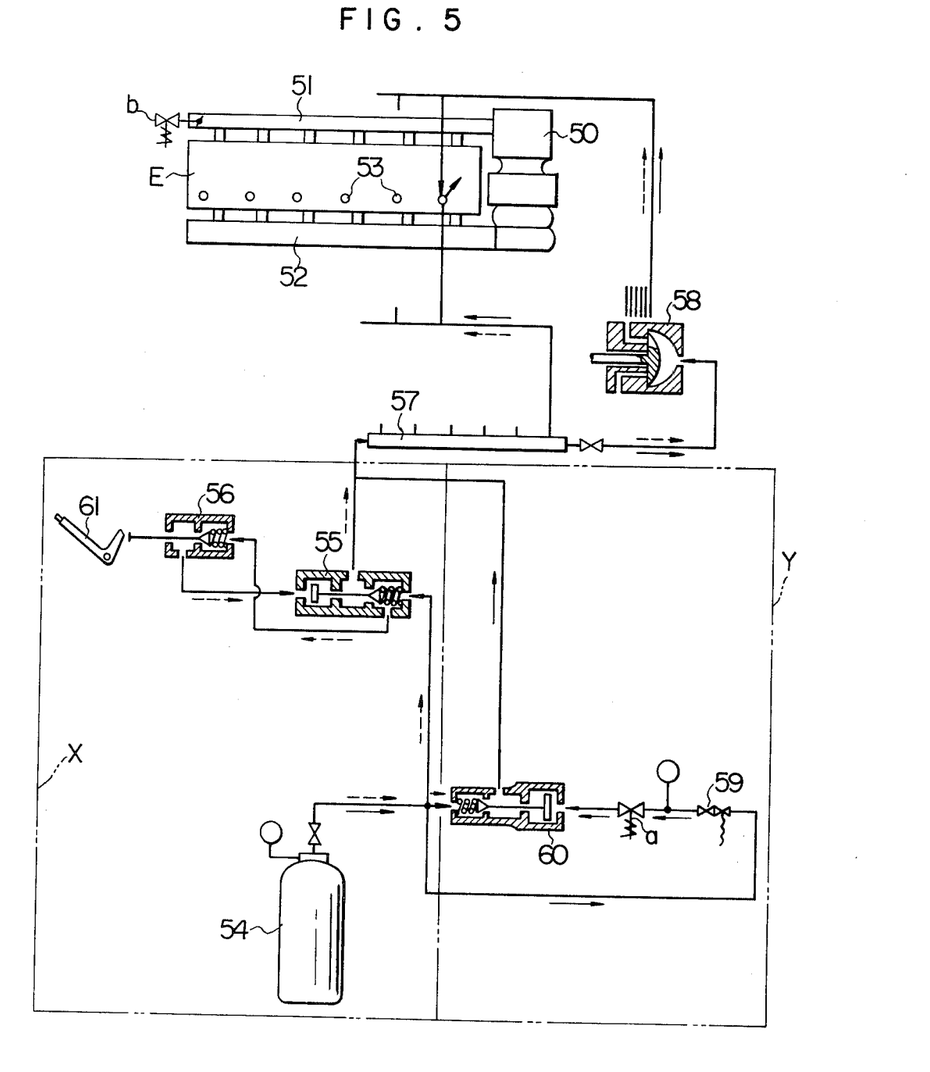
FIG. 5 is a piping diagram of the air feed device and intake air relief device of this invention.

Now reference should be had to FIG. 5 illustrating the air feed device A and intake air relief device B. An internal combustion engine E such as, for example, a Diesel engine equipped with a supercharger 50 is provided with an intake manifold 51, an exhaust manifold 52 and a starting valve 53. Indicated at 54 is an air tank for storing the air under pressure. Said air tank 54 is connected to a main starting air pipe 57 via starting air choke valve 55 and a starting air control valve 56, forming as a whole a starting air feed system X. Said main starting air pipe 57 is so arranged as to communicate with the engine cylinder and also connected to the starting valve 53 by way of a starting air distribution valve 58. To set up a load follow-up air feed system Y adjacent to the starting air feed system X, the air tank 54 is also connected by means of connection pipes to a decompression valve 59, solenoid valve a designed to receive a signal from the control circuit device 1 and load follow-up air choke valve 60. By the provision of such a system Y the air can be supplied into the engine E bypassing the starting air feed system X. Indicated at 61 is an operation handle for the starting air control valve 56.

An opening solenoid valve b serving as the intake air relief device B is arranged in a suitable position within the intake manifold 51. The opening solenoid valve b is operative in association with the solenoid valve a.

The air feed device A operates in the following manner:-

To start the engine E the starting air control valve 56 is first opened by operating the starting handle 61. This allows the pressurized air in the air tank 54 to flow passing through the starting air choke valve 55 and then starting air control valve 56 and thence into the in starting air pipe as shown by the dotted line arrow. At this time the starting valve 53 is opened by a starting air distribution valve 58, permitting the introduction of the air into the engine cylinder. On the other hand, when a load is suddenly applied to the engine E the control circuit device 1, as mentioned previously, actuates the solenoid valve a in response to the load signal from the revolution change detector 2. This permits the pressurized air to flow out of the air tank through the decompression valve 59 as shown by the real line arrow. The following air then opens the load follow-up air choke valve 60. Under these conditions the pressurized air flows continuously through said load follow-up air choke valve 60 into the main starting air pipe 57 and thence fed into the engine cylinder.

Now the operation of the intake air relief device B will be described. When the control circuit device 1 operates in response to the load signal and when the solenoid valve a operates under control of said control circuit device 1 as referred previously, the opening solenoid valve b operates simultaneously. This makes the intake manifold 51 communicate with the atmosphere so that the normal supercharger air pressure may be maintained by discharging a portion of the pressurized air from the intake manifold into atmosphere. In this way the appearance of the surging phenomenon of the supercharger 50 can be eliminated.

Figure 6:
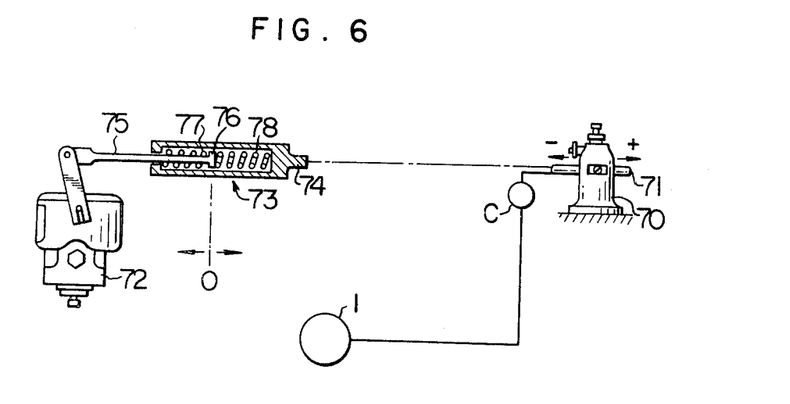
FIG. 6 is an elevational view for explaining the operation of the fuel rack shifting device of this invention.

Reference should be had to FIG. 6 illustrating the fuel rack shifting device C, wherein the rack 71 of the fuel pump 70 and a speed governor 72 are connected together by means of a connecting rod 73. The connecting rod 73 is designed in such a manner that irrespective of the operation of the speed governor 72 the rack 71 alone can be shifted in the fuel increasing (+) or decreasing (−) side in response to an external force, or, more specifically, the connecting rod 73 is provided with a cylinder 74 of which one end is operatively connected to the rack 71. Within the cylinder 74 is received a piston 76 which is integral with a governor lever 75. Springs 77 and 78 are loaded within the cylinder 74 so that they engage with the opposite ends of the piston 76. Indicated at *c* is a solenoid built into the control circuit 1. As is described previously with reference to FIG. 2, the solenoid *c* actuates in response to a signal from the control circuit 1 for thereby shifting the rack 71 towards + side.

Now the operation of the fuel rack shifting device C will be described. As is mentioned previously, when a load is suddenly applied to the engine E the revolution change detector 2 imparts a corresponding load signal to the control circuit device 1 for thereby actuating solenoid valves *a* and *b* as well as solenoid *c*. The solenoid *c* acts on the rack 71, shifting it towards the fuel increasing side, or + side. It should be noted that the governor lever 75 or piston 76 is not influenced at all by compressing the spring 78 which is loaded within the connecting rod 73, and hence the rack 71 can be shifted towards the fuel increasing side (+) irrespective of the operation of the governor lever 75.

Figure 7:
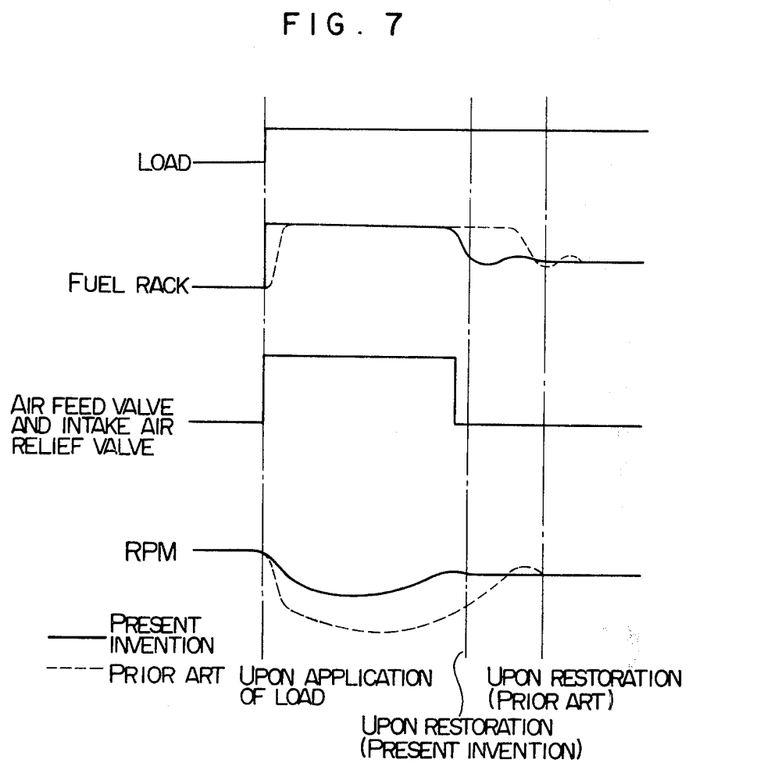
FIG. 7 is a graphical representation of the operation characteristic of the load follow-up device according to this invention, the operation characteristic being shown in comparison with a prior art technique.

An internal combustion engine E equipped with a supercharger as well as a load follow-up device according to the foregoing embodiment will operate at a constant speed under normal load. When an additional load is suddenly applied to the engine E, its r.p.m. will be reduced and a corresponding load signal will be applied instantly from the revolution change detector 2 to the control circuit device 1. As a result, the solenoid valves *a* and *b* as well as the solenoid *c* in the control circuit device 1 start operation, thereby operating the air feed device A, intake air relief device B and fuel rack shifting device C. Then these devices immediately detect the application of load to the engine E and, without any time delay, feed a pressurized air into the engine cylinder, thereby shifting the fuel rack towards the fuel increasing side (+) to supply a sufficient fuel and then permitting a portion of the pressurized air having flown out of the intake manifold to discharge into atmosphere. FIG. 7 is a graph representing the foregoing operation in comparison with the prior art technique, wherein the operation according to this invention being shown by a real line, while the operation according to the prior art technique being shown by a dotted line.

It will be appreciated that by application of this invention an internal combustion engine, even when an additional load is applied thereto, can maintain a sufficient combustion characteristic enough to develop a desired output, so that the reduction in the engine speed can be minimized. Besides, the rising time after application of a load is shortened substantially compared with the prior art techniques. Also, the load follow-up characteristic can be improved extremely and the danger of unexpected engine stoppage can be eliminated. Furthermore, because a portion of the pressurized air which has flown out of the engine cylinder into the intake manifold is discharged into atmosphere, the danger of supercharger surging and abnormal increase in the air pressure within the intake manifold can be eliminated.

Figure 8:
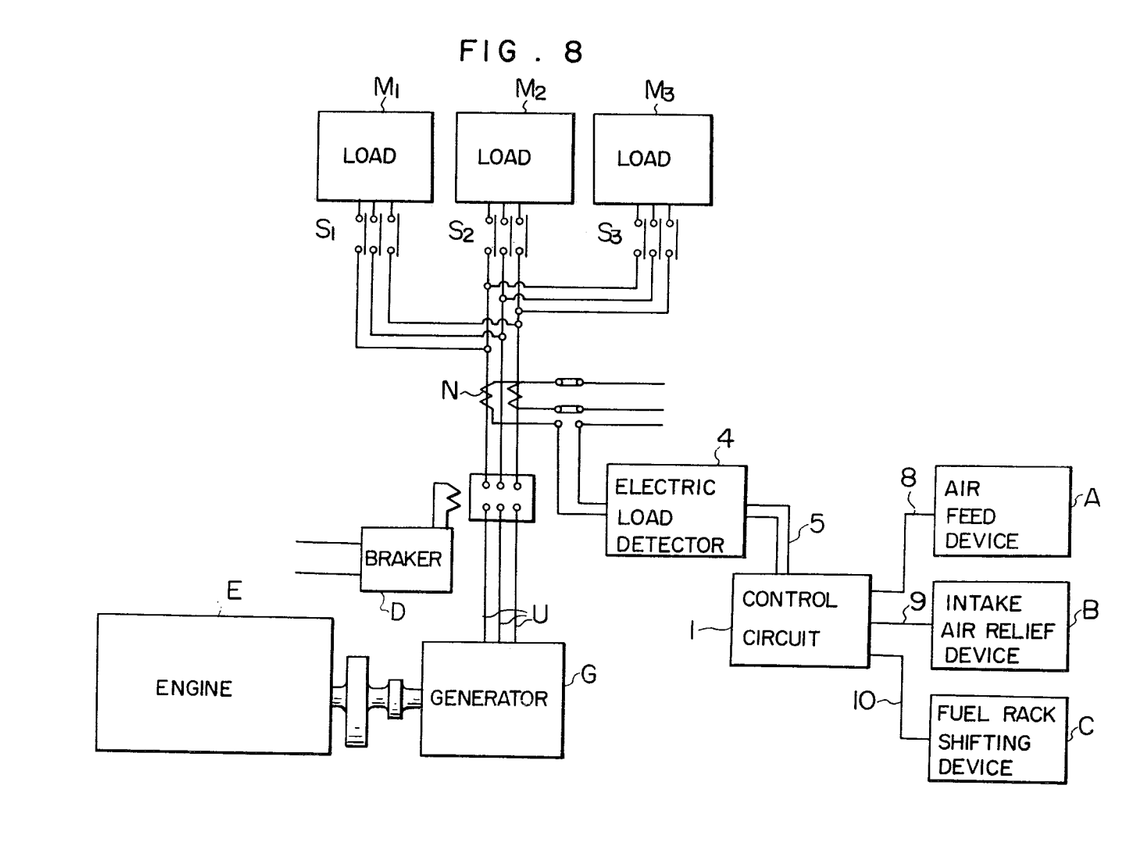
FIG. 8 is a schematic connection diagram illustrating another embodiment of this invention.

Now the follow-up device according to the second embodiment of this invention will be described with reference to FIG. 8. This embodiment is substantially equal to the foregoing first embodiment excepting that an electric load detector 4 is employed in place of said revolution charge detector 2, and hence like components are indicated by like reference letters and numerals.

The electric load detector 4 is arranged, by way of a current transformer N, in an intermediate position of the leads U extending from the generator G to the loads $M_1$, $M_2$, $M_3$, etc. The electric load detector 4 is connected to the control circuit device 1 over lead wires 5 and imparts a signal to the control circuit device 1 in response to the load current, or increase in the current, at the moment of load application.

Figure 9:
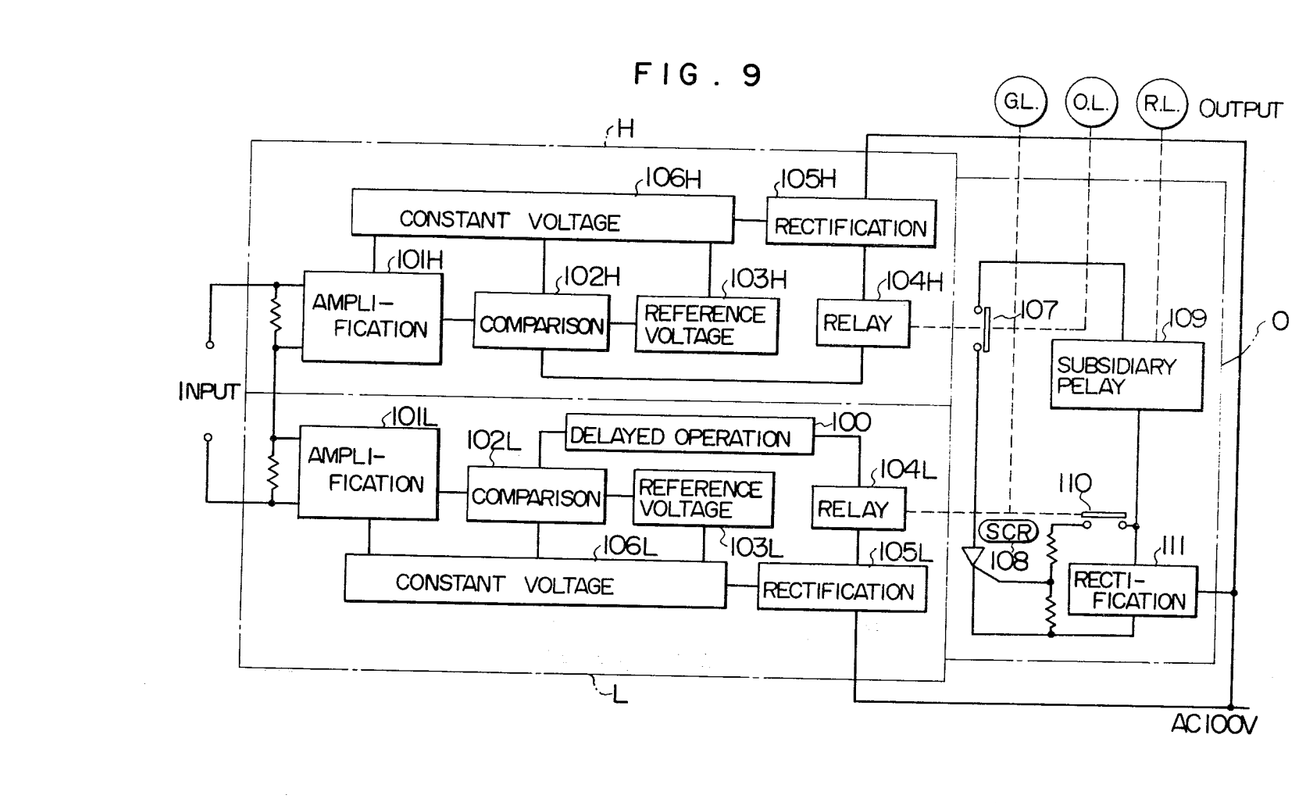
FIG. 9 is a block diagram of the electric load detector of this invention.

With reference to the block diagram of FIG. 9 the construction of the electric load detector 4 will be described hereinunder. The electric load detector 4 consists of a higher limit indicating circuit H, lower limit indicating circuit L and an operating circuit O. The lower limit indicating circuit L has an almost similar construction to the higher limit indicating circuit H excepting that it is provided with a delay circuit 100 for providing a delay time of approximately 1 second.

The higher and lower limit indicating circuit H and L are provided with amplifiers 101H and 101L, respectively, for amplifying the load current input from the current transformer N. Subsequent to these amplifiers 101H and 101L are arranged comparators 102H and 102L, respectively, so that the amplifier load current inputs can be compared with the higher or lower limit reference voltages from higher or lower limit reference voltage device 103H or 103L. The higher or lower limit indicating circuits H and L include higher and lower limit relays 104H and 104L, respectively, to receive signals from the comparators, for thereby operating the switches in the operation circuit C. The higher and lower limit indicating circuits H and L also include rectifiers 105H and 105L, respectively, as well as constant voltage devices 106H and 106L, respectively.

The higher limit indicating circuit H is so constructed that, when the load current input exceeds the preset level of the higher limit reference voltage device 103H, it develops a signal from the comparator 102H to operate the relay 104H. Whereas the lower limit indicating circuit L is arranged in such a manner that, when the load current input is lower than the present level of the lower limit reference voltage device 103L, it develops a signal from the comparator 102L for thereby operating the relay 104L.

In the operation circuit O a switch 107, SCR 108 and subsidiary relay 109 for operating the switch 17 (see FIG. 2) in the control circuit device are serially connected to each other. Said switch 107 serves as an output contact of the relay 104H which is arranged in the higher limit indicating circuit H. The SCR 108 is connected in such a manner that a gate voltage is applied thereto only when a switch 11C, which acts as an output contact of the relay 104L in the lower limit indicating circuit L, is under operation. It will be seen from FIG. 9 that a rectifier 111 is also incorporated into the operation circuit O.

O.L. stands for an orange indicator lamp which grows upon operation of the higher limit relay 104H; G.L. a green indicator lamp which grows upon operation of the lower limit relay 104L; R.L. a red indicator lamp which grows upon operation of the subsidiary relay 109. These indicator lamps permit the operator to visually distinguish which of the circuits is now under operation.

Now the operation of the electric load detector 4 will be described. Making use of the self holding characteristic of the SCR 108, the subsidiary relay 109 is so arranged as to couple a signal with the control circuit device 1 only when the load current input increases suddenly, or more specifically within a delay time less than 1 sec. which is provided by the delay circuit 100, from a level lower than the preset lower limit to a level higher than the preset higher limit. Under these circumstances, the comparator 102L develops a signal and puts the relay 104L into operation after an interval of 1 sec. by way of the delay circuit 100. The comparator 102H also develops a signal to thereby directly operate the relay 104H. It should be noted here that the higher limit relay 104H starts operation preceding to the lower limit relay 104L because of the short rising time of the load current which is as short as less than 1 sec. Accordingly, upon closure of the switch 107, the switch 110 lies closed to apply a gate voltage to the SCR 108. Even if, after 1 sec. from the closure of the switch 107, the lower limit relay 104L becomes inoperative to thereby open the switch 110, the operation circuit O will maintain closed state due to its self holding characteristic. It will be apparent that the indicator lamps O.L. and R.L. keep growing at that time.

When the load current input is reduced to a level lower than the preset higher level, the signal from the comparator 102H ceases and the relay 104H becomes inoperative. Consequently, the switch 107 opens, the subsidiary relay 109 restores and the indicator lamps O.L. and R.L. turn off.

It will be understood from the foregoing that the subsidiary relay 109 does not become operative so long as the load current input exceeds the preset higher limit after an interval of longer than 1 sec. which is measured from the very moment when it exceeds the preset lower limit. This is because the switch 110 adapted to apply a gate voltage to the SCR 108 opens before the switch 107 being closed, and the operation circuit O does not form a closed circuit. By use of an electric load detector, the load follow-up device has a wide selectivity in its control operation.

Figure 10:
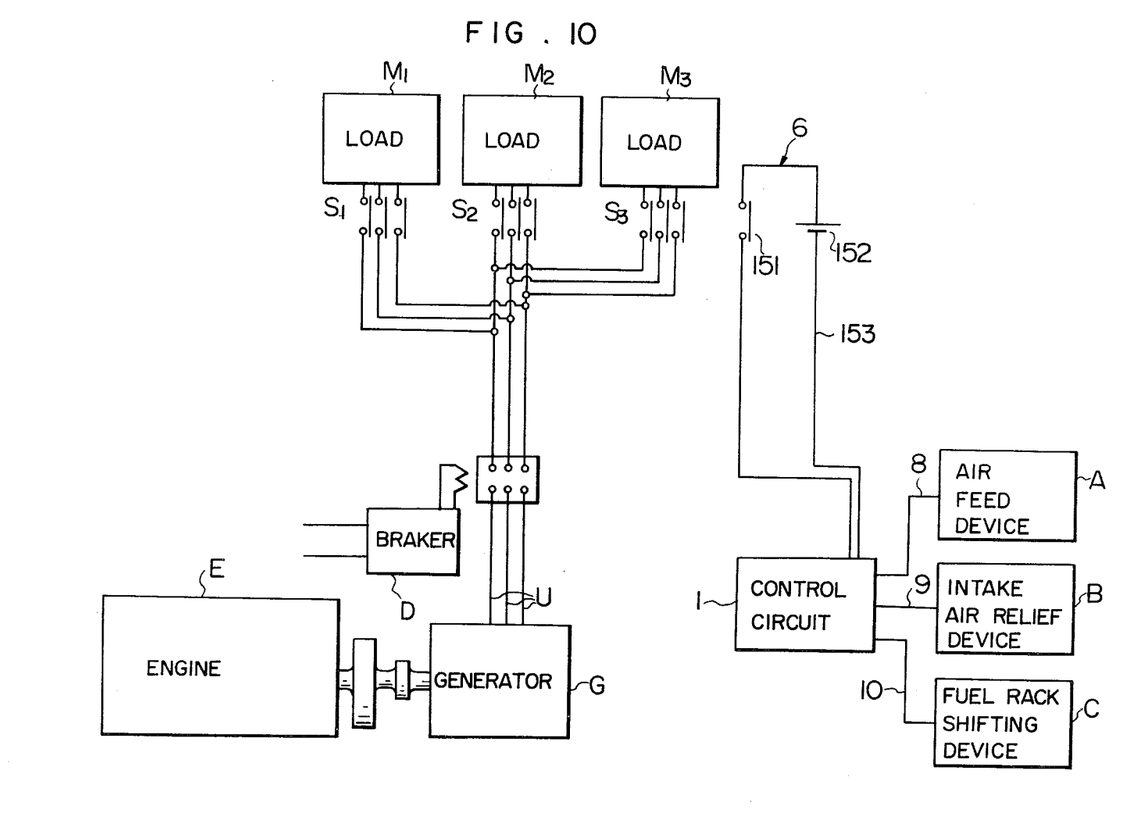
FIG. 10 is a connection diagram illustrating still another embodiment of this invention.

FIG. 10 illustrates still another embodiment of the load follow-up device according to this invention. This embodiment is substantially similar to the foregoing two embodiments excepting that it employs a contact-associating type detector 6 in place of said revolution change detector 2 and electric load detector 4 and, hence, like components are indicated by like reference letters and numerals.

The contact-associating type detector 6 consists of a contact 151 and power source 152 which are connected in series by means of lead wires 153. The contact 151 is operative in association with a switch $S_3$ for the large capacity load $M_3$, so that upon closure of the switch $S_3$ the contact 151 closes to give a signal to the control circuit device 1.

In this embodiment another one or more switches may be operative in associated with the contact depending on the capacity of the loads $M_1$, $M_2$, $M_3$, etc. It will be apparent to those skilled in the art that the lost-mentioned embodiment provided a load follow-up operation with a very simple construction.

What is claimed is:

1. An internal combustion engine having at least one cylinder and equipped with a supercharger for feeding air into the cylinder by way of an intake manifold, a control member for controlling the rate of supply of fuel to the cylinder, and a load follow-up device which comprises:

detector means operatively connected with the engine to sense a sudden application of load to the engine;

air feed means operable to admit air into the engine cylinder directly, without passing through the intake manifold;

intake air relief means operable to vent pressurized air from the intake manifold to atmosphere;

actuating means operable to displace the control member to increase the rate of supply of fuel; and control circuit means connected to th detector means to respond substantially instantly to a sensed sudden application of load by operating the air feed means, the intake air relief means and the actuating means to admit air into the cylinder directly, vent pressurized air from the intake manifold, and increase the rate of supply of fuel thereby to follow-up faithfully the application of the additional load and prevent reduction in engine speed.

2. An internal combustion engine as claimed in claim 1, having an output shaft and wherein the detector means comprise a revolution change detector consisting of a rotary ring fixedly mounted on said output shaft and carrying a pair of mutually opposed projections, a follower ring rotatably mounted around the output shaft so that it encircles the rotary ring, a spring maintained under pressure between a rear surface of one of said projections and an abutment portion of the follower ring, and a contact device arranged between a rear surface of the other projection and a second abutment portion of the follower ring.

3. An internal combustion engine as claimed in claim 1, wherein the detector means comprise an electric load detector provided with a subsidiary relay which is operative to deliver a response signal to the control circuit means only when a load exceeding a large preselected value is applied to the engine at a speed exceeding a predetermined value.

4. An internal combustion engine as claimed in claim 1, having a starting air feed system which comprises a source of air under pressure, a control valve for controlling flow of air from said source, and a starting valve for admitting air into the engine cylinder directly, without passing through the intake manifold, and wherein the air feed means comprise a choke valve connected in parallel with said control valve whereby air can pass from said source to said starting valve without passing through said control valve, and a solenoid valve operative to open the choke valve in response to a signal from the control circuit means.

5. An internal combustion engine as claimed in claim 4, wherein the intake air relief means comprise an opening valve connected to vent pressurized air from the intake manifold to atmosphere, the opening valve being arranged to open upon operation of said solenoid valve.

6. An internal combustion engine as claimed in claim 1, wherein the intake means comprise an opening valve connected to vent pressurized air from the intake manifold to atmosphere, the opening valve being arranged to open upon operation of the air feed means.

7. An internal combustion engine as claimed in claim 1, equipped with a speed governor and a connecting rod having one end connected to the speed governor and an opposite end connected to the control member, whereby the rate of supply of fuel can be controlled in dependence upon the position of said one end of the connecting rod, and wherein the connecting rod is constructed so that the control member can be displaced independently of the position of said one end of the connecting rod, and the actuating means comprise a solenoid mounted to be effective against the control member and connected to operate in response to a signal from the control circuit means.

* * * * *